United States Patent
Lack et al.

(10) Patent No.: US 9,599,283 B2
(45) Date of Patent: Mar. 21, 2017

(54) POWER MODULATION FOR AMMONIA DELIVERY SYSTEM

(71) Applicant: International Engine Intellectual Property Company, LLC, Lisle, IL (US)

(72) Inventors: Adam C Lack, Boulder, CO (US); Navtej Singh, Arlington Heights, IL (US); Randall R. Roepke, Chicago, IL (US); Michael James Miller, Mt. Prospect, IL (US)

(73) Assignee: Internaitonal Engine Intellectual Property Company, LLC., Lisle, IL (US)

( * ) Notice: Subject to any disclaimer, the term of this patent is extended or adjusted under 35 U.S.C. 154(b) by 0 days.

(21) Appl. No.: 14/440,287

(22) PCT Filed: May 25, 2013

(86) PCT No.: PCT/US2013/042779
§ 371 (c)(1),
(2) Date: May 1, 2015

(87) PCT Pub. No.: WO2014/070245
PCT Pub. Date: May 8, 2014

(65) Prior Publication Data
US 2015/0300573 A1    Oct. 22, 2015

Related U.S. Application Data

(60) Provisional application No. 61/722,126, filed on Nov. 2, 2012.

(51) Int. Cl.
*F17C 11/00* (2006.01)
*F17C 9/02* (2006.01)
(Continued)

(52) U.S. Cl.
CPC .............. *F17C 9/02* (2013.01); *F01N 3/2066* (2013.01); *F17C 11/00* (2013.01); *C01C 1/006* (2013.01);
(Continued)

(58) Field of Classification Search
CPC ... C01C 1/006; F01N 3/2066; F01N 2610/06; F01N 2610/105; F01N 2610/1808;
(Continued)

(56) References Cited

U.S. PATENT DOCUMENTS

| | | | |
|---|---|---|---|
| 8,449,857 B2 * | 5/2013 | Johannessen | B01D 53/0454 206/0.7 |
| 2010/0047638 A1 * | 2/2010 | Johannessen | B01D 53/9431 429/421 |

(Continued)

*Primary Examiner* — Frank Lawrence
(74) *Attorney, Agent, or Firm* — Jack D. Nimz; Jeffrey P. Calfa

(57) ABSTRACT

A system for storage and dosing of ammonia includes solid ammonia storage material capable of binding and releasing ammonia reversibly by adsorption/absorption. The system includes a start-up storage unit and a main storage unit, both of which hold ammonia storage material. A start-up heating device is arranged to heat the start-up storage unit to generate gaseous ammonia by thermal desorption from the solid storage material. A main heating device arranged to heat the main storage unit to generate gaseous ammonia by thermal desorption from the solid storage material. A controller modulates operation of the heating devices such that the main and start-up heating devices are not simultaneously activated.

5 Claims, 5 Drawing Sheets

(51) Int. Cl.
  *F01N 3/20* (2006.01)
  *C01C 1/00* (2006.01)
(52) U.S. Cl.
  CPC .... *F01N 2610/06* (2013.01); *F01N 2610/105* (2013.01); *F01N 2900/1808* (2013.01); *F17C 2227/0304* (2013.01); *Y02T 10/24* (2013.01)
(58) Field of Classification Search
  CPC .... F17C 9/02; F17C 11/00; F17C 2227/0304; Y02T 10/24; B01D 2259/4525
  USPC ........... 96/108, 113, 146; 95/19, 21, 128; 206/0.7; 423/237
  See application file for complete search history.

(56) References Cited

U.S. PATENT DOCUMENTS

2010/0086467 A1\* 4/2010 Johansen ................ C01C 1/006
 423/352
2011/0280768 A1\* 11/2011 Kawasaki .............. B01D 53/90
 422/111

\* cited by examiner

POWER MODULATION FOR AMMONIA DELIVERY SYSTEM

BACKGROUND

Selective catalytic reduction (SCR) is commonly used to remove $NO_x$ (i.e., oxides of nitrogen) from the exhaust gas produced by internal engines, such as diesel or other lean burn (gasoline) engines. In such systems, $NO_x$ is continuously removed from the exhaust gas by injection of a reductant into the exhaust gas prior to entering an SCR catalyst capable of achieving a high conversion of $NO_x$.

Ammonia is often used as the reductant in SCR systems. The ammonia is introduced into the exhaust gas by controlled injection either of gaseous ammonia, aqueous ammonia or indirectly as urea dissolved in water. The SCR catalyst positioned in the exhaust gas stream causes a reaction between $NO_x$ present in the exhaust gas and a $NO_x$ reducing agent (e.g., ammonia) to reduce/convert the $NO_x$ into nitrogen and water.

In many applications, such as SCR systems for vehicles, for example, the storage of ammonia in the form of a pressurized liquid in a vessel may be too hazardous and a storage method involving absorption in a solid may circumvent the safety hazard of anhydrous liquid ammonia. For example, metal ammine salts are ammonia absorbing materials, which can be used as solid storage media for ammonia, which in turn, for example, may be used as the reductant in SCR to reduce $NO_x$ emissions from internal combustion engines in vehicles, see e.g., U.S. Pat. No. 8,088,201 and WO 1999/01205. The ammonia can be released from the ammine salts through thermal desorption, e.g., by external heating of a storage container, see e.g., id. and U.S. Patent App. Pub. NO. 2010/0086467. The ammonia is released from an either adsorptive or absorptive solid storage medium, among others $Sr(NH_3)_8Cl_2$ or $Ca(NH_3)Cl_2$ in granular form, in a storage container and temporarily stored as a gas in a buffer volume. The amount of ammonia to be supplied to a reaction volume in the vehicle's exhaust system is dosed under the control of an electronic controller according to the current operating state of the engine.

In vehicular applications, the SCR system typically includes one or more main storage units and a smaller start-up storage unit. Heating devices are arranged to heat the main storage units and start-up storage unit separately to generate gaseous ammonia by thermal desorption. The amount of ammonia to be desorbed from the storage medium can, for example, be controlled by a feed-back control in which the pressure in the storage container is measured by a pressure sensor. The heater can be cycled on and off to maintain the pressure in the storage container at or near a target pressure. The start-up storage unit is generally much smaller than the main storage units so that it reaches the pressure threshold more rapidly than the main storage units and, accordingly, can begin supplying gaseous ammonia to the SCR system in a shorter period of time. However, due to its limited storage capacity, the start-up storage unit is not suitable as a long-term source of ammonia for the SCR system.

Simultaneously operating the heating units for the start-up storage unit and one or more main storage units may place excessive loads on the vehicle's electrical system. Accordingly, it is desirable to provide a method for modulating operation of the main and start-up storage units to reduce the load placed on the vehicle's electrical system.

SUMMARY

Aspects and embodiments of the present technology described herein relate to one or more systems and methods for release of stored ammonia.

According to at least some embodiments of the present technology, a system is provided for storage and dosing of ammonia. The system is of the type that includes solid ammonia storage material capable of binding and releasing ammonia reversibly by adsorption/absorption. The system includes a start-up storage unit and a main storage unit, both of which hold ammonia storage material. A start-up heating device is arranged to heat the start-up storage unit to generate gaseous ammonia by thermal desorption from the solid storage material. A main heating device arranged to heat the main storage unit to generate gaseous ammonia by thermal desorption from the solid storage material. A controller modulates operation of the heating devices such that the main and start-up heating devices are not simultaneously activated.

According to at least some embodiments, the system includes a dosing valve arranged to control ammonia flow from the storage units to a consuming system. The controller is configured to control operation of the dosing valve according to a demand.

At least some embodiments can include at least one one-way valve interconnecting the main storage unit with the start-up storage unit. The one-way valve prevents backflow of ammonia from the start-up storage unit to the main storage unit.

According to at least some embodiments of the present technology, the controller is configured to monitor the pressure in the start-up storage unit and activate the start-up heating unit until the pressure in the start-up storage unit reaches a first pressure threshold. The controller can further be configured to turn off the start-up heating unit until the pressure in the start-up storage unit drops below a second pressure threshold.

Some embodiments of the present technology are directed a method for storing and dosing of ammonia from a solid ammonia storage material capable of binding and releasing ammonia reversibly by adsorption/absorption. The method includes providing a main storage unit and a start-up storage unit that hold ammonia storage material. The method also includes heating the start-up storage unit until the pressure in the start-up storage unit reaches a first pressure threshold and thereafter heating the main storage unit while simultaneously not heating the start-up storage unit until either the pressure in the start-up storage unit falls below a second pressure threshold or the pressure in the main storage unit reaches a third pressure threshold. According to at least some embodiments, if the pressure in the start-up storage unit falls below the second pressure threshold before the pressure in the main unit reaches the third pressure threshold, the method modulates operation of the start-up and main heating units until the pressure in the main storage unit reaches a third pressure threshold. Further, according to at least some embodiments, once the pressure in the main storage unit reaches the third pressure threshold, the method controls heating of the main storage unit to maintain the pressure in the main storage unit between the third pressure threshold and a fourth pressure threshold which is lower than the third threshold.

DETAILED DESCRIPTION

Various examples of embodiments of the present technology will be described more fully hereinafter with reference to the accompanying drawings, in which such examples of embodiments are shown. Like reference numbers refer to like elements throughout. Other embodiments of the presently described technology may, however, be in many different forms and are not limited solely to the embodiments set forth herein. Rather, these embodiments are examples representative of the present technology. Rights based on this disclosure have the full scope indicated by the claims.

Figure 1:
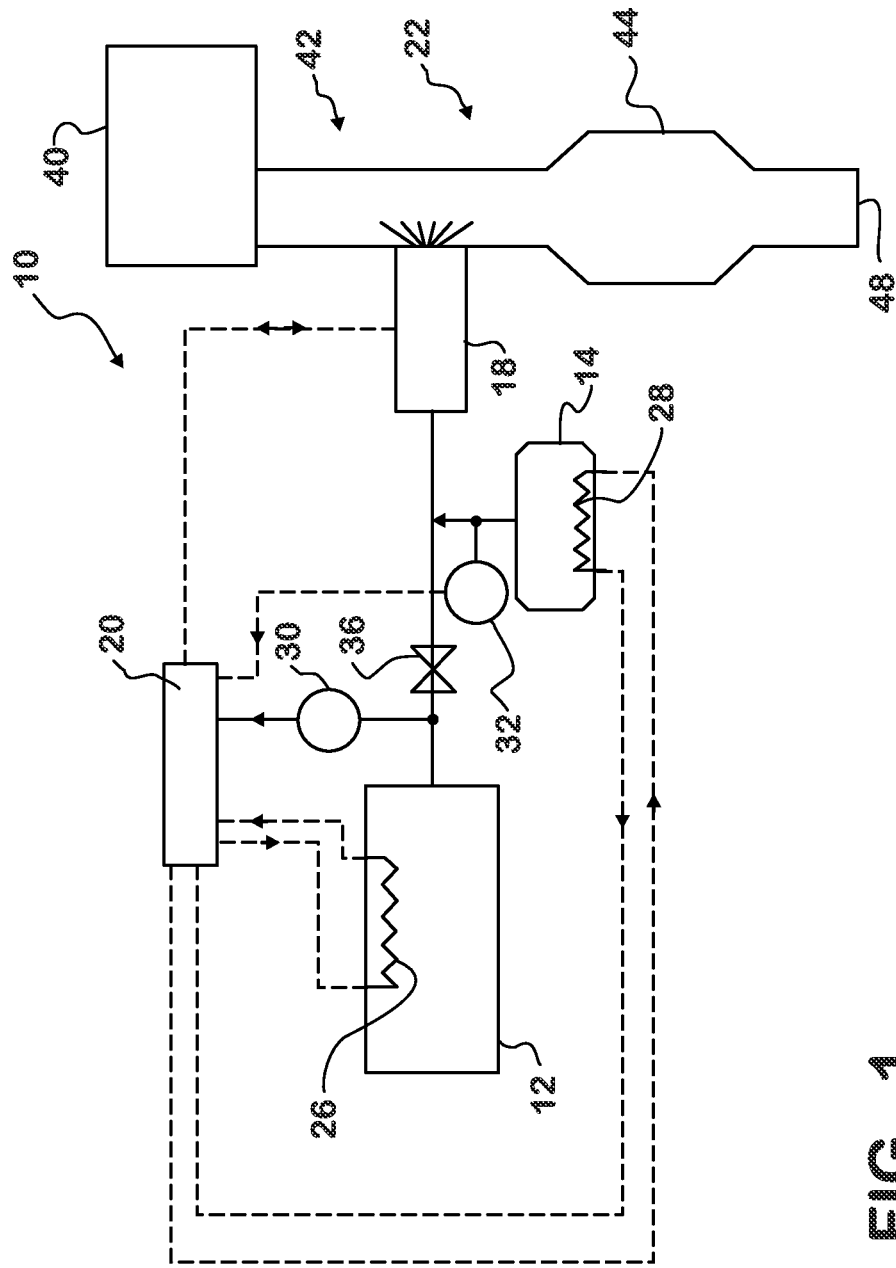
FIG. 1 is a schematic illustration of an exemplary ammonia storage and dosing system according to at least one embodiment of the present technology.

FIG. 1 is a schematic diagram illustrating an embodiment of an ammonia storage and dosing system 10 according to at least one embodiment of the present technology. The ammonia storage and dosing system 10 includes a main storage unit 12 and a start-up storage unit 14. In the example of FIG. 1, the main storage unit 12 is made up of a single storage container which holds ammonia storage material. In other embodiments (see, e.g., FIGS. 2 and 3), the storage material of the main storage unit 12 is held in more than one container. The start-up storage unit 14 can be relatively small compared to the main storage unit 12, to facilitate rapid start up. The number and the size of the other containers that make up the main storage unit 12 can vary in accordance with design and performance parameters, including for example, the desired total ammonia amount reserves and the start-up time of the main storage unit. The coupling of several storage containers can be performed in a variety of different ways in combination with passive one-way valves, active valves, pressure sensors, pressure switches etc. Additional details and considerations regarding the size and number of storage units are provided in U.S. Patent Application Pub. No. 2010/0086467 (the "467 Publication"), the disclosure of which is hereby incorporated in its entirety.

The storage units 12, 14 are fluidly connected to a dosing valve 18 by which ammonia from the storage units 12, 14 is dosed according to a demand to an ammonia consuming process or system 22, such as a selective catalytic reduction (SCR) system, is in the desired proportion. An electronic control unit 20 controls operation of the dosing valve 18 to control delivery of ammonia from the storage and dosing system 10 to consuming system 22

Heating devices 26, 28, such as electrical heaters, are provided for heating the main storage unit 12 and the start-up storage unit 14, respectively. The heating units 26, 28 can be placed inside the main storage unit 12 and the start-up storage unit 14 containers. The ECU 20 is operable to control (e.g., switch on or off, and/or regulate) the heating devices 26, 28 independently from each other, e.g., by controlling the power supplied to them.

Pressure sensors 30, 32 monitor the pressure in the main and start-up storage units 12, 14, respectively and produce signals indicative of the sensed pressures. The ECU 20 is coupled to the pressure sensors 30, 32 for receipt of the pressure signals. The ECU 20 is also configured to control the dosing valve 18, e.g., by providing it with a variable dosing target value (for example, the dosing target value prescribes a certain degree of opening of the dosing valve).

According to at least some embodiments, the main storage unit 12 and the start-up storage unit 14 can be fluidly coupled by a valve. In some embodiments, the valve can be a passive, one-way valve 36. The one-way valve 36 closes when the pressure downstream of it (i.e., the pressure in the start-up storage unit 14) is higher than that upstream of it (i.e. lower than the pressure in the main storage unit 12), and opens when the upstream pressure becomes higher than the down-stream pressure. Accordingly, the one-way valve 36 allows the main storage unit 12 to resaturate the smaller (rapid) start-up storage unit 14 with ammonia, e.g., in situations where the system 10 is powered off (because the pressure in the main storage unit 12 will be higher than that in the start-up storage unit 14, when the main storage unit 12 is more saturated), or where heating of the start-up storage unit 14 has ceased while the main storage unit 12 continues to be heated. This increases the likelihood that the smaller, start-up storage unit, is available to make a rapid start-up. At the same time the one-way valve 36 prevents ammonia from being introduced into the main storage unit 12 from the smaller start-up storage unit 14 when the pressure in the latter is higher, particularly during start-up.

In the embodiment illustrated in FIG. 1, the ammonia storage and dosing system 10 is used to supply reductant (i.e., ammonia) for selective catalytic reduction (SCR) of $NO_x$ in the exhaust emitted by an internal combustion engine 40. The ECU 20 (or another controller) controls delivery of ammonia from the storage and dosing system 10 and into the exhaust system 42 through the dosing valve 18. The dosing valve 18 is positioned in the exhaust system 42 upstream from a catalyst 44. As the ammonia is injected into the exhaust system 42, it mixes with the exhaust gas and this mixture flows through the catalyst 44. The catalyst 44 causes a reaction between $NO_x$ present in the exhaust gas and a $NO_x$ reducting agent (e.g., ammonia) to convert the $NO_x$ into nitrogen and water which then passes out of the tailpipe 48 and into the environment. While the system 10 has been described in the context of SCR for engine exhaust, it will be appreciated that the system could be used to supply ammonia in other applications, such as ammonia used as an energy carrier for a fuel cell or ammonia used as a reactant or additive in a chemical reaction, as described in greater detail in the aforementioned 467 Publication.

Figure 2:
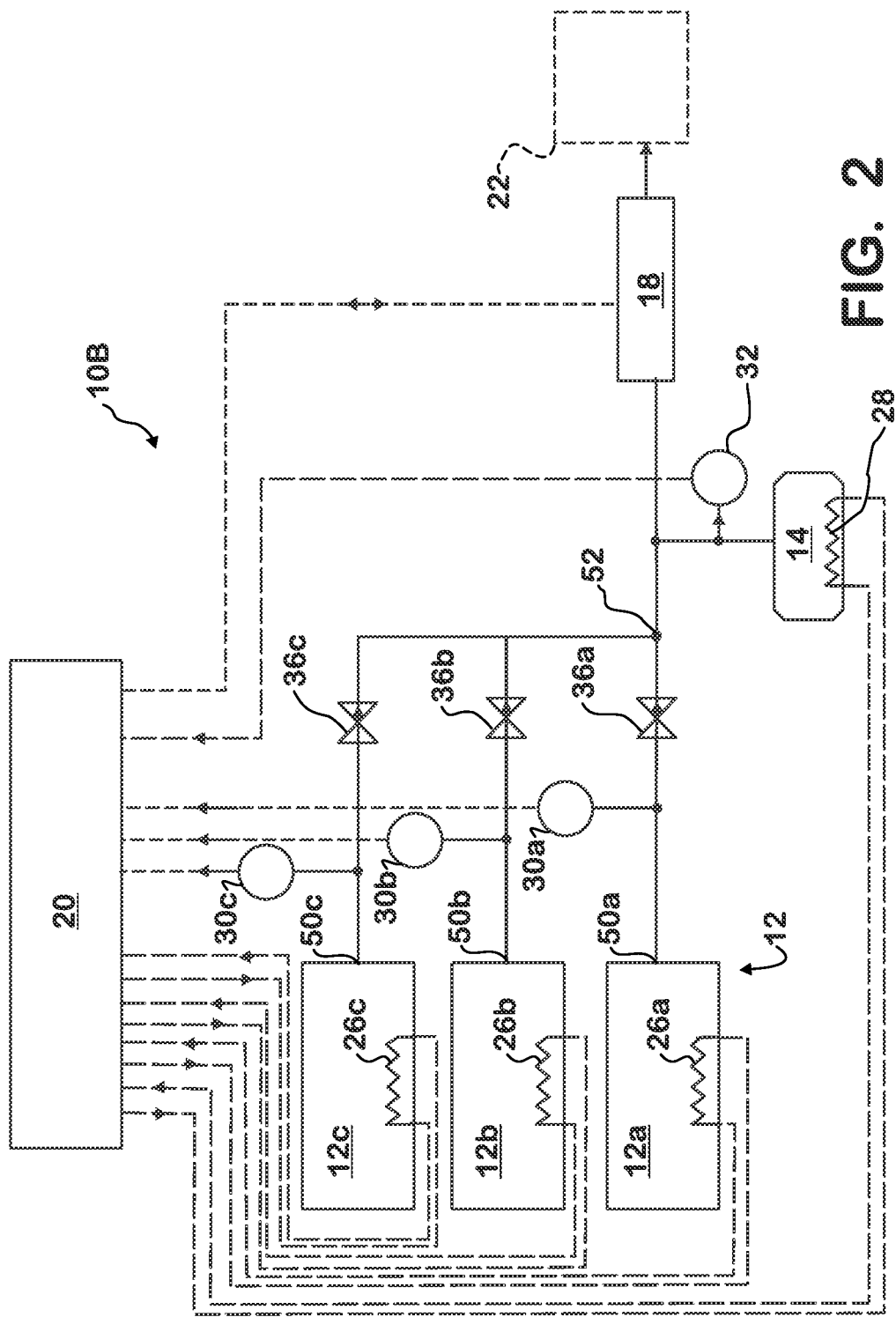
FIG. 2 is a schematic illustration of an exemplary ammonia storage and dosing system according to at least one embodiment of the present technology, with the main storage unit being composed of a plurality of sub-units connected in parallel.
Figure 3:
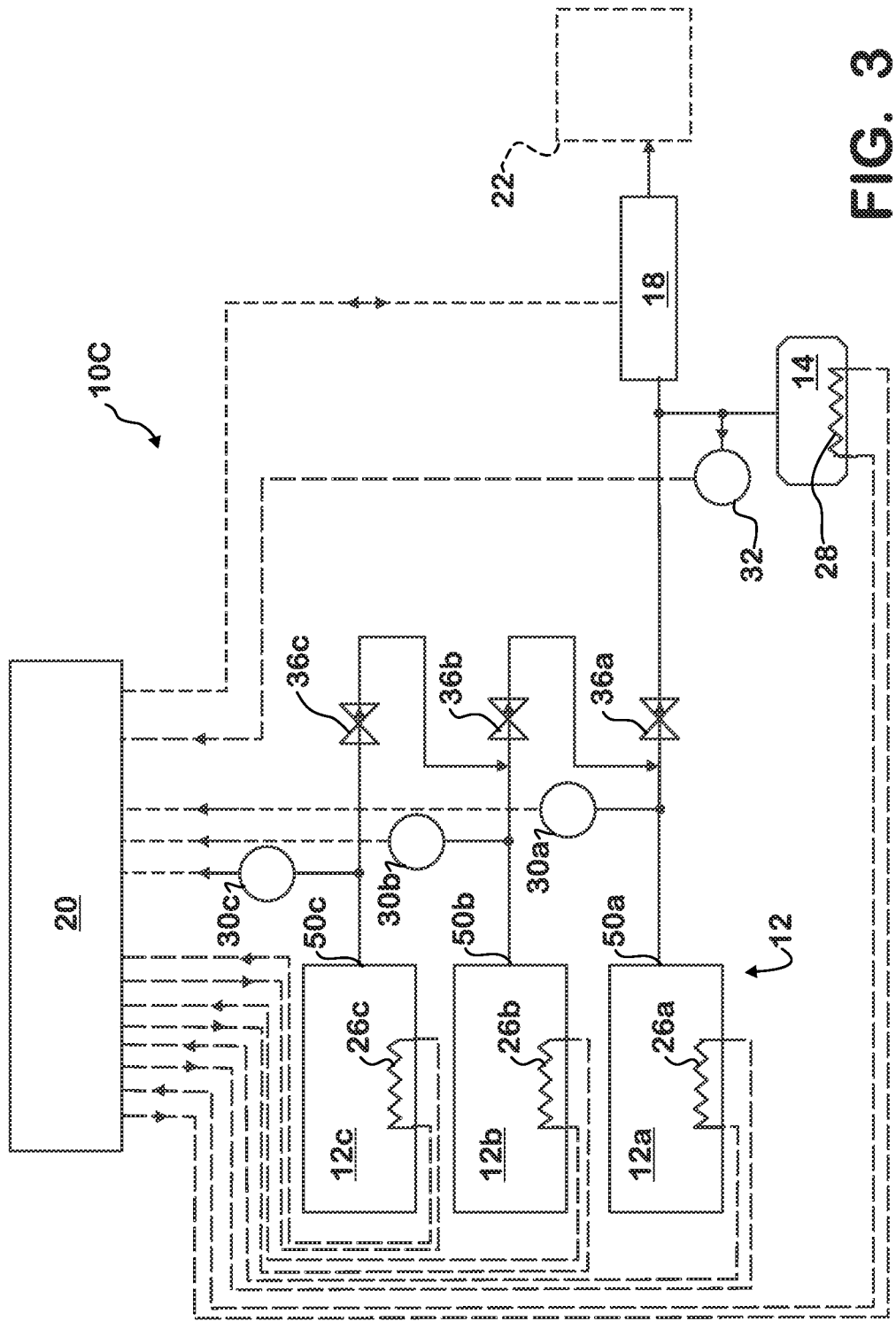
FIG. 3 is a schematic illustration of an exemplary ammonia storage and dosing system according to at least one embodiment of the present technology, with the main storage unit being composed of a plurality of serially connected sub-units.

FIGS. 2 and 3 illustrate exemplary ammonia storage and dosing systems 10B, 10C where the main storage unit 12 is composed of a plurality of sub-units 12a, 12b, 12c. In FIG. 2, the sub-units 12a, 12b, 12c are connected in parallel, while in FIG. 3, the sub-units are serially connected. The embodiments of FIGS. 2 and 3 use many components that are the same or similar to the components described above in connection with FIG. 1. Accordingly, like reference numbers have been used to identify similar components and the systems of FIGS. 2 and 3 will only be briefly described. Regarding the other features, reference is made to the detailed description of FIG. 1 above, which also applies to the embodiments of FIGS. 2 and 3.

In both the embodiments of FIGS. 2 and 3, the main storage unit 12 is composed of a plurality (three in the illustrated examples) of sub-units 12a, 12b, 12c, each of which has respective heating devices 26a, 26b, 26c. The ECU 10 can individually and selectively operate the heating units 26a, 26b, 26c to control heating of the individual sub-units 12a, 12b, 12c.

In the embodiment of FIG. 2, the sub-units 12a, 12b, 12c are fluidly connected in parallel. Each sub-unit 12a, 12b, 12c is equipped with its own passive one-way valve 36a, 36b, 36c. The up-stream side of each one-way valve 36a, 36b, 36c is connected with the ammonia outlet 50a, 50b, 50c of a respective sub-unit 12a, 12b, 12c. The downstream sides of all the one-way valves 36a, 36c, 36d are joined together in a point of parallel coupling 52. Pressure sensors 30a, 30b, 30c monitoring the pressure in each of the respective sub-units 12a, 12b, 12c and deliver responsive pressure signals to the ECU 20.

The parallel connection arrangement of FIG. 2 enables selective depletion of individual ones of the sub-units 12a, 12b, 12c, by only heating the sub-unit(s) to be depleted. The parallel connection and the one-way valves 36a, 36b, 36c ensure that a sub-unit 12a, 12b, 12c that is depleted to a greater extent than another sub-unit is not resaturated on the other sub-unit's expense. However, resaturation of the start-up storage unit 14 is governed by that sub-unit from among all the sub-units 12a, 12b, 12c that is least depleted (because it will produce the highest pressure). This, in turn, enables the start-up functionality to be particularly safe and long-running. By the use of passive one-way valves 36a, 36b, 36c, this function can be achieved automatically without the need to actively switch between the sub-units 12a, 12b, 12c.

FIG. 3 is a diagram similar to FIG. 2, except that the sub-units 12a, 12b, 12c are connected serially. Each sub-unit 12a, 12b, 12c is equipped to a passive one-way valve 36a, 36b, 36c. The upstream side of each one-way valve 36a, 36b, 36c is connected with the ammonia outlet 50a, 50b, 50c of its respective sub-unit 12a, 12b, 12c, and with the downstream side of the one-way valve 36a, 36b, 36c of the sub-unit preceding in the direction of flow (however, the one way-valve 36a of the most upstream sub-unit 12a is not connected to a one-way valve of a preceding sub-unit, because there is no preceding sub unit; similarly, the downstream side of the one-way valve 36a of the most downstream sub-unit 12a is not connected to the upstream side of a subsequent sub-unit's one-way valve, because there is no subsequent sub-unit). The down-stream side of the one-way valve 36a of the most downstream sub-unit 12a forms the outlet of the main storage unit 12 and is connected to the dosing valve 18. As in FIG. 1, there is no pressure sensor upstream the (most downstream) one-way valve 36a.

As with FIG. 2, such an arrangement also enables selective depletion of individual ones of the sub-units 12a, 12b, 12c, by only heating the sub-unit(s) to be depleted. However, while in FIG. 2 the sub-units are equitable, and the order of depleting the sub-units can be freely chosen, the serial connection of FIG. 3 establishes a sequential order between the sub-units 12a, 12b, 12c. In order to achieve the functionality mentioned above (selective depletion without resaturation of sub-units of the main storage unit, but with resaturation of the start-up storage unit), the sub-units can be heated sequentially, from the upstream to the downstream sub-units (i.e. from 12c to 12b to 12a). The one-way valves 36a, 36b, 36c between the sub-units 12a, 12b, 12c ensure that a sub-unit (e.g. 12c) that is already depleted to a greater extent than the downstream sub-unit(s) (e.g. 12a and 12b) is (are) not resaturated on the other sub-units' expense. However, resaturation of the start-up storage unit 14 is governed by the downstream sub-unit(s) (e.g. 12b and 12a). This, in turn, enables the start-up functionality to be particularly safe and long-running. Again, by the use of passive one-way valves 36a, 36b, 36c, this functionality can be achieved automatically, without any actively performed switching between the sub-units 12a, 12b, 12c. Using an arrangement like the one showed in FIG. 3 gives the possibility of exploiting ammonia that would otherwise be unusable. The last fraction of ammonia in a storage unit (e.g. 12c) will not be able to maintain dosing pressure under normal operating conditions, and hence the system will change to the next storage unit in the series (e.g. 12b). While the system is depleting ammonia from a downstream sub-unit (e.g. 12b), an upstream sub-unit (e.g. 12c) can be heated up again. Although it usually cannot be used on its own for normal operation, it will still be possible to withdraw more of the ammonia in the upstream sub-unit (e.g. 12c), hereby increasing the storage capacity of the system; the ammonia released will then act as a supplement to the ammonia from the downstream sub-unit (e.g. 12b). In some cases the ammonia released from the upstream sub-unit (e.g. 12c) will be used to resaturate the down-stream sub-unit (e.g. 12b).

Figure 4:
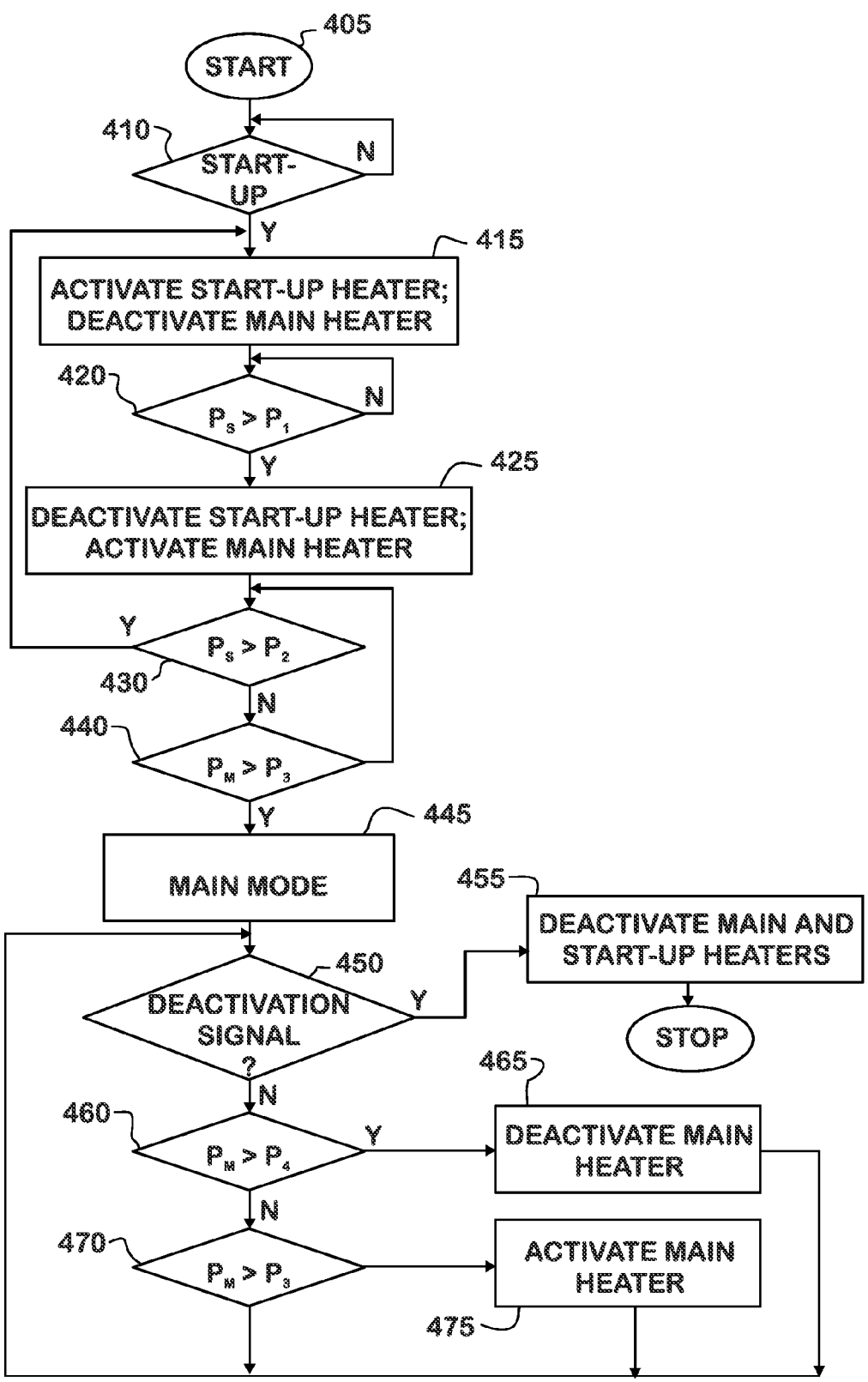
FIG. 4 is a flow diagram of an exemplary method for determining modulating power according to at least one embodiment of the present technology.

FIG. 4 is a flow chart illustrating at least one embodiment of a method 400 for operating an ammonia storage and distribution system of the types described above. Certain aspects of the present technology relate to a method for modulating activation of multiple heating elements in an ammonia storage and distribution system, particularly during start up in order to quickly raise the pressure the start-up storage unit and maintain operating pressure in the start-up storage unit while charging at least one of the main storage units during period.

The method begins in step 405. Control is then passed to the step 410 where the method monitors for the occurrence of a start-up condition. A start-up condition can, for example, be indicated by a request to provide ammonia dosing when the system 10, 10B, 10C has been inactive for a predetermined period of time or when the pressure in all of the storage containers is below a required delivery threshold, for example.

When a start-up condition occurs, control is passed to step 415 where the method deactivates the main heating unit 26 and activates start-up heating unit 28. Control is then passed to step 420 where the method checks to see if the pressure $P_S$ in the start-up storage unit has reached a first preselected pressure threshold P1. The method 400 continues to heat the start-up storage unit 14 until its pressure $P_S$ reaches the first pressure threshold P1.

Once pressure in the start-up storage unit rises to the first pressure threshold P1, control is passed to step 425. In step 425, the method 400 deactivates the start-up heating unit 28 and activates the main heating unit 26.

Control is then passed step 430, where the method checks to determine if the pressure $P_S$ in the start-up storage unit 14 has dropped below a second pressure threshold P2. If the pressure $P_S$ in the start-up storage unit 14 has dropped below a second pressure threshold P2, control is returned to step 415, which causes deactivation of the main heating unit 26 and activation of the start-up heating unit 28. The method 400 then continues from step 415 in the manner described above.

If, in the step 430, the method 400 determines that the pressure $P_S$ in the start-up storage unit 14 has not dropped below the second pressure threshold P2, control is passed to step 440. In step 440, the method 400 checks to determine if the pressure $P_M$ in the main storage unit 12 has reached a third predetermined pressure threshold P3. If it has not, control is returned to step 430.

The method continues to loop through steps 430 and 440 until either the pressure $P_S$ in start-up storage unit 14 drops below the second pressure threshold P2, or the pressure $P_M$ in the main storage unit 12 rises above the third pressure threshold P3. As will be appreciated, during this time, the start-up heating unit 28 is inactive and the main heating unit 26 is active. If the pressure $P_S$ in the start-up storage unit 14 drops below the second pressure threshold P2 before the pressure $P_M$ in the main storage unit 12 rises above the third threshold P3, control is returned to step 415, which causes deactivation of the main heating unit 26 and activation of the start-up heating unit 28. The method then continues from step 415 in the manner described above. Conversely, if the pressure $P_M$ in the main storage unit 12 rises above the third pressure threshold P3 before pressure in the start-up storage unit falls below the second pressure threshold P2, control is passed to the step 445, where operation is switched to the main mode. For example, the method can set a software flag to indicate that the system has transitioned from the start-up mode to the main mode.

Control is then passed to step 450, where the method checks for a shut-down signal, which is used to indicate that the system 10 is to be deactivated. For example, the system 10 can be deactivated when the consuming system 22 is not operating. In this respect, when the consuming system 22 is an SCR system for an engine, the system 10 can be deactivated when the engine is not running. The shut-down signal can also be used to deactivate the system 10 when one of the storage units 12, 14 needs to be replaced or refilled, for example. If a shut-down signal is detected, control is passed to step 455 where the main and start-up heating devices 26, 28 are both deactivated.

Otherwise, control is passed to step 460, where the method determines if the pressure $P_M$ in the main storage unit exceeds a fourth pressure threshold P4. If the pressure $P_M$ in the main storage unit exceeds the fourth pressure threshold P4, control is passed to step 465 where the method deactivates the main heating unit 26. Control is then returned to step 450.

Conversely, if the pressure $P_M$ in the main storage unit does not exceed the fourth pressure threshold P4, control is passed to step 470. In step 470 the method determines if the pressure $P_M$ in the main storage unit 12 has dropped below the third fourth pressure threshold P3. If the pressure $P_M$ in the main storage unit 12 is below the third fourth pressure threshold P3, control is passed to step 475, where the method activates the main heating unit 26. Control is then returned to step 450.

Accordingly, once the method transitions from the start-up mode to the main mode, the method continues to loop through steps 450-470 until a deactivation signal is detected in step 450. As the method loops through steps 450-470, it modulates the main heater on and off to maintain the pressure in the main storage unit 12 between the third and fourth pressure thresholds P3, P4.

Figure 5A:
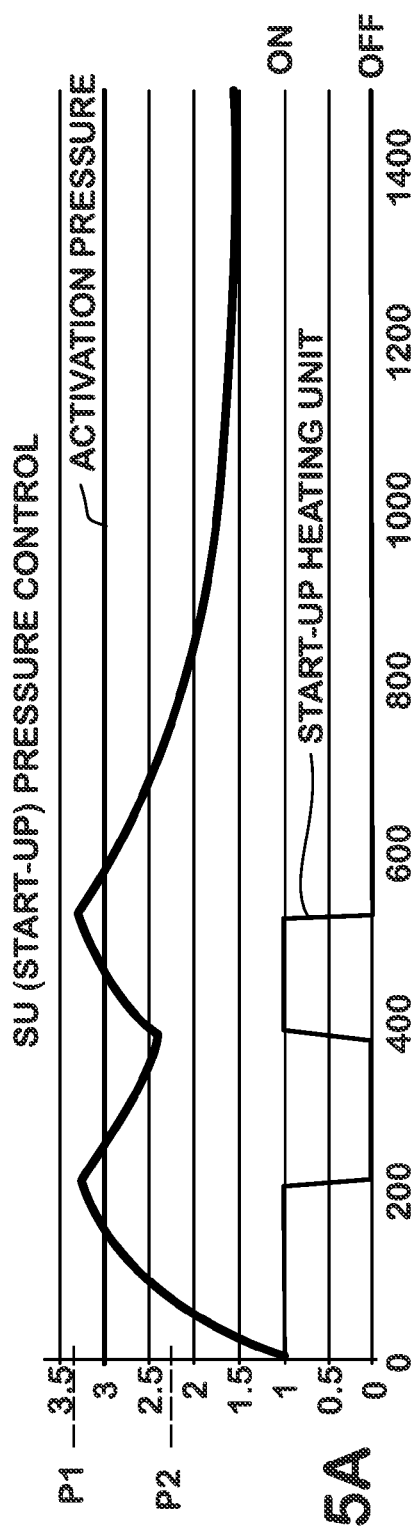
FIGS. 5A and 5B are graphs illustrating an exemplary power modulation strategy according to at least one embodiment of the present technology.
Figure 5B:
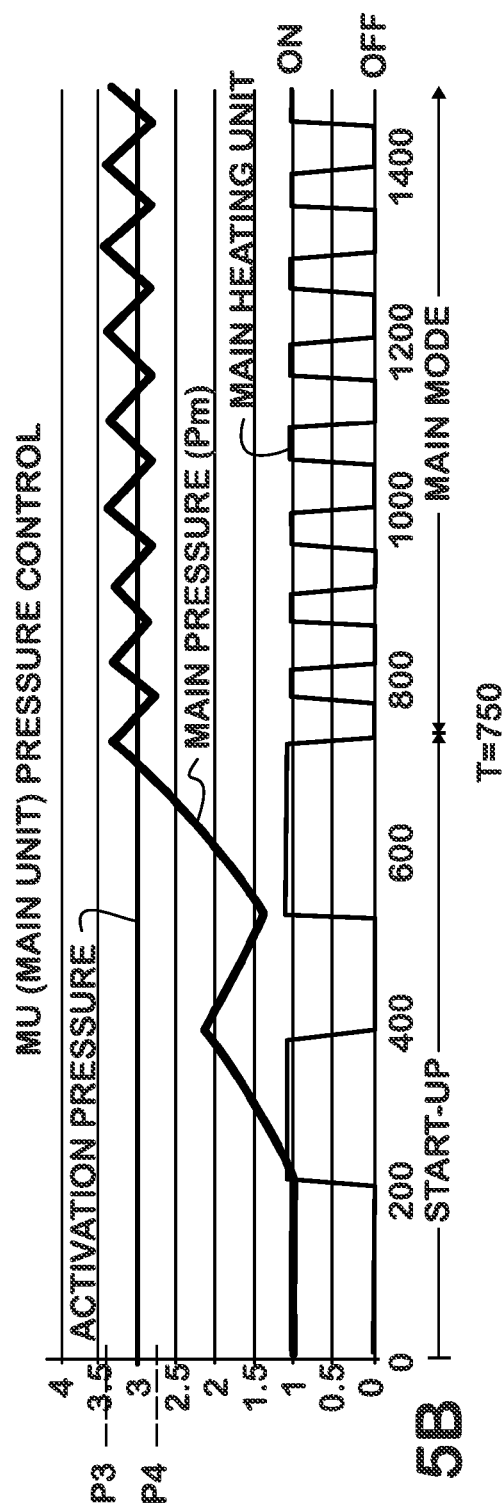

With reference to FIGS. 5A and 5B, the above method and system operate to initially raise the pressure $P_S$ in the start-up storage unit 14 to the first pressure threshold P1 by activating the start-up heating unit 28. In the illustrated embodiment, this occurs between time T=0 and T=200. It will be appreciated that the times reflected in FIGS. 5A and 5B are merely provided for illustration purposes. Once the pressure $P_S$ in the start-up storage unit 14 reaches the first pressure threshold P1, operation of the start-up heating unit 28 is modulated on and off to maintain the pressure $P_S$ in the start-up storage unit between the first and second pressure thresholds P1, P2. The first and second pressure thresholds are selected to maintain the pressure $P_S$ in the start-up storage unit 14 around its activation pressure.

Once the pressure $P_S$ in the start-up storage unit 14 reaches the first pressure threshold P1 (e.g., at T=200 in the illustrated example), the start-up heating unit 28 is turned off and the main heating unit 26 is turned on. The main heating unit 26 remains active until either the pressure $P_S$ in the start-up storage unit 14 drops below the second pressure threshold P2 or the pressure $P_M$ in the main storage unit 12 rises above the third pressure threshold P3.

If the pressure $P_S$ in the start-up storage unit 14 falls below the second pressure threshold P2 before the pressure $P_M$ in the main storage unit 12 reaches the third pressure threshold P3 (e.g., at about T=400 in the illustrated example), then the main heating unit 26 is deactivated and the start-up heating unit 28 is reactivated.

During the start-up mode, the main and start-up heating units 26, 28 are modulated on and off in the above manner unit the pressure $P_M$ in the main storage unit 12 reaches the third pressure threshold P3. Once the pressure $P_M$ in the main storage unit 12 reaches the third pressure threshold P3 (e.g., at about T=750 in the illustrated example), the system/method transitions from the start-up mode to the main mode. In the main mode, the start-up heating unit 28 remains off, while the main heating unit 26 is modulated on and off to maintain the pressure $P_M$ in the main storage unit 12 between the third and fourth pressure thresholds P3, P4. The third and fourth pressure thresholds P3, P4 are selected to maintain the pressure $P_M$ in the main storage unit 12 around its activation pressure.

Accordingly, during the start-up mode, the start-up heating unit 28 is controlled to initially raise pressure $p_S$ in the start-up storage unit 14 to its activation pressure. Once the activation pressure is reached, the start-up heating unit 28 is modulated on and off to maintain pressure $p_S$ in the start-up storage unit 14 at or about its activation. When the start-up heating unit 28 is cycled off, the main heating unit 26 is cycled on to gradually raise the pressure $p_M$ in the main storage unit 12 towards its activation pressure. During the start-up mode, the main and start-up heating units 26, 28 are modulated to maintain the start-up storage unit 14 around its activation pressure, while raising the pressure $p_M$ in the main storage unit 12 during the times that the start-up heating unit 28 is off. Accordingly, the pressure in the start-up heating unit 28 can be quickly raised to the activation pressure so that the system can begin supplying reductant from the start-up storage unit 14. Once the pressure $p_M$ in the main storage unit 12 reaches its activation pressure, the system/method transitions to the main mode where reductant is supplied from the main storage unit 12. During the main mode, the start-up heating unit 28 remains off, while the main heating unit 26 is modulated on and off to maintain the pressure in the main storage unit 12 at or about its activation pressure. Because the heating units 26, 28 are never active at the same time, the power requirements, e.g., from a vehicle power system, can be reduced.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains. While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A system for storage and dosing of ammonia that comprises a solid ammonia storage material capable of binding and releasing ammonia reversibly by adsorption/absorption, the system comprising:
   a start-up storage unit and a main storage unit, the storage units holding ammonia storage material;
   a start-up heating device arranged to heat the start-up storage unit to generate gaseous ammonia by thermal desorption from the solid storage material;
   a main heating device arranged to heat the main storage unit to generate gaseous ammonia by thermal desorption from the solid storage material;
   a controller configured to monitor and control operation of the main and start-up heating devices, wherein the controller modulates operation of the heating devices such that the main and start-up heating devices are not simultaneously activated; by
   a) activating the start-up heating unit until the pressure in the start-up storage unit reaches a first pressure threshold;
   b) thereafter deactivating the start-up heater and activating the main heating unit until either the pressure in the start-up storage unit falls below a second pressure threshold or the pressure in the main storage unit reaches a third pressure threshold;
   c) if the pressure in the start-up storage unit falls below the second pressure threshold before the pressure in the main storage unit reaches the third pressure threshold, then repeating steps a and b until the pressure in the main storage unit reaches a third pressure threshold; and
   d) once the pressure in the main storage unit reaches the third pressure threshold, deactivating the start-up heating unit and control the main heating unit to maintain the pressure in the main storage unit between the third pressure threshold and a fourth pressure threshold.

2. The system of claim 1, further comprising a dosing valve arranged to control ammonia flow from the storage units, and wherein the controller is configured to control operation of the dosing valve according to a demand.

3. The system of claim 1, further comprising at least one one-way valve interconnecting the main storage unit with the start-up storage unit, the one-way valve preventing any back-flow of ammonia from the start-up storage unit to the main storage unit.

4. A system for storage and dosing of ammonia that comprises a solid ammonia storage material capable of binding and releasing ammonia reversibly by adsorption/absorption, the system comprising:
   a start-up storage unit and a main storage unit, the storage units holding ammonia storage material;
   a start-up heating device arranged to heat the start-up storage unit to generate gaseous ammonia by thermal desorption from the solid storage material;
   a main heating device arranged to heat the main storage unit to generate gaseous ammonia by thermal desorption from the solid storage material;
   a controller configured to monitor the pressure in the storage units and control operation of the main and start-up heating devices, the controller being configured to
   a) activate the start-up heating unit until the pressure in the start-up storage unit reaches a first pressure threshold;
   b) thereafter deactivate the start-up heater and activate the main heating unit until either the pressure in the start-up storage unit falls below a second pressure threshold or the pressure in the main storage unit reaches a third pressure threshold;
   c) if the pressure in the start-up storage unit falls below the second pressure threshold before the pressure in the main storage unit reaches the third pressure threshold, then repeat steps a and b until the pressure in the main storage unit reaches a third pressure threshold; and
   d) once the pressure in the main storage unit reaches the third pressure threshold, deactivate the start-up heating unit and control the main heating unit to maintain the pressure in the main storage unit between the third pressure threshold and a fourth pressure threshold.

5. A method for storing and dosing of ammonia from a solid ammonia storage material capable of binding and releasing ammonia reversibly by adsorption/absorption, the method comprising:
   a) providing a main storage unit and a start-up storage unit, the storage units holding ammonia storage material;
   b) heating the start-up storage unit until the pressure in the start-up storage unit reaches a first pressure threshold;
   c) thereafter heating the main storage unit while simultaneously not heating the start-up storage unit until either the pressure in the start-up storage unit falls below a second pressure threshold or the pressure in the main storage unit reaches a third pressure threshold;
   d) if the pressure in the start-up storage unit falls below the second pressure threshold before the pressure in the main storage unit reaches the third pressure threshold, then repeating steps b and c until the pressure in the main storage unit reaches a third pressure threshold; and
   e) once the pressure in the main storage unit reaches the third pressure threshold, controlling heating of the main storage unit to maintain the pressure in the main storage unit between the third pressure threshold and a fourth pressure threshold which is lower than the third threshold.

* * * * *